Oct. 17, 1967  HIROSHI MONMA  3,348,086
FLAT CORELESS DIRECT CURRENT MOTOR
Filed Nov. 10, 1964  4 Sheets-Sheet 1

INVENTOR.
HIROSHI MONMA
ATTORNEYS

Oct. 17, 1967  HIROSHI MONMA  3,348,086
FLAT CORELESS DIRECT CURRENT MOTOR
Filed Nov. 10, 1964  4 Sheets-Sheet 2

INVENTOR.
HIROSHI MONMA
BY
ATTORNEYS

Oct. 17, 1967  HIROSHI MONMA  3,348,086
FLAT CORELESS DIRECT CURRENT MOTOR
Filed Nov. 10, 1964  4 Sheets-Sheet 3

INVENTOR.
HIROSHI MONMA
BY McGlew and Toren
ATTORNEYS

Oct. 17, 1967  HIROSHI MONMA  3,348,086
FLAT CORELESS DIRECT CURRENT MOTOR
Filed Nov. 10, 1964  4 Sheets-Sheet 4

INVENTOR.
HIROSHI MONMA
BY Mulslew and Toren
ATTORNEYS

United States Patent Office 3,348,086
Patented Oct. 17, 1967

3,348,086
FLAT CORELESS DIRECT CURRENT MOTOR
Hiroshi Monma, Tokyo, Japan, assignor to Fujiya Denki Kabushiki Kaisha, Tokyo, Japan
Filed Nov. 10, 1964, Ser. No. 410,054
Claims priority, application Japan, Nov. 20, 1963, 38/62,074; Apr. 21, 1964, 39/22,163; Apr. 27, 1964, 39/32,620
6 Claims. (Cl. 310—268)

ABSTRACT OF THE DISCLOSURE

The disclosure is directed to a substantially flat coreless direct current motor including a substantially flat and substantially planar coil assembly comprised of five truncated-sector-shape substantially flat coils each having an angular extent of substantially 144°, the coils being arranged in arcuately overlapping relation with each coil arcuately overlapping adjacent coils to an angular extent of substantially 72°. A pair of truncated-sector-shape field magnets are provided, each having an angular extent of substantially 144°, and the magnets are in diametrically opposed relation and substantially concentric with the coil assembly. A commutator is substantially concentric with the coil assembly, and the latter and the commutator are mounted for conjoint rotation relative to the field magnets in an air gap defined by magnetic yoke means and the field magnets. The leading end of each coil, considering in the direction of coil assembly rotation, is connected to the trailing end of an adjacent coil at a respective junction point, and each junction point is connected to a respective commutator segment. A pair of diametrically opposite brushes are engaged with the commutator and have a relative angular position such that commutation of each coil is effected when its bisecting radius coincides with the bisecting radius of a field magnet.

A feature of the disclosure is that one or more of the coils may be formed with one or more stepped offsets whereby the coil assembly has an overall thickness which is equal to substantially twice the thickness of one coil.

---

It is well gnown to provide a flat coreless direct current motor with two sector-shaped field magnets and three sector-shaped coils. The motor of such construction is not suitable for use in a phonic motor for sound transducers and the like, because, due to high spark voltages upon commutation, sparks occur between brushes and commutators thereby causing noise to be generated.

It is an object of this invention to provide a motor suitable for use as a phonic motor of relatively low spark voltage, relatively uniform torque and high efficiency.

It is another object of this invention to minimize gaps between field magnets and a stator so as to construct the motor as flat as possible and to reduce the magnetic reluctance thereof, thereby obtaining relatively high flux density.

The accompanying drawings illustrate embodiments of the invention, wherein

Figure 1:
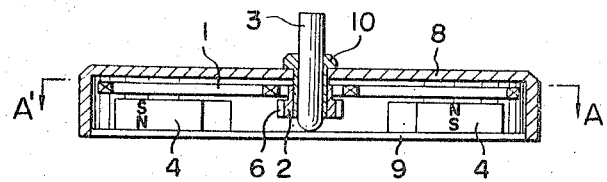
Figure 2:
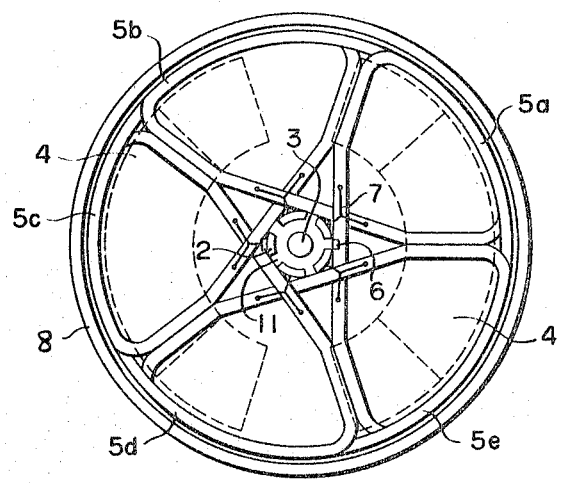
Figure 6:
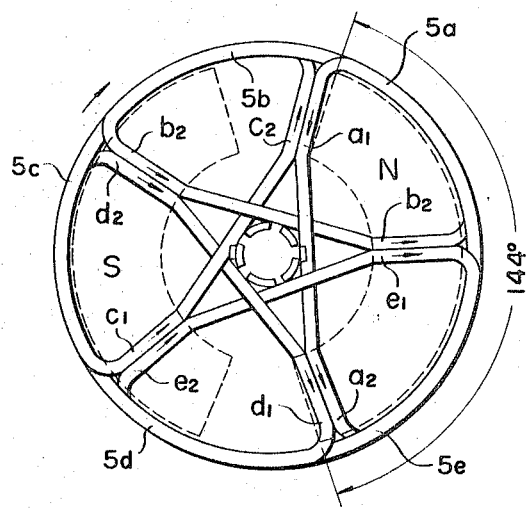
Figure 7:
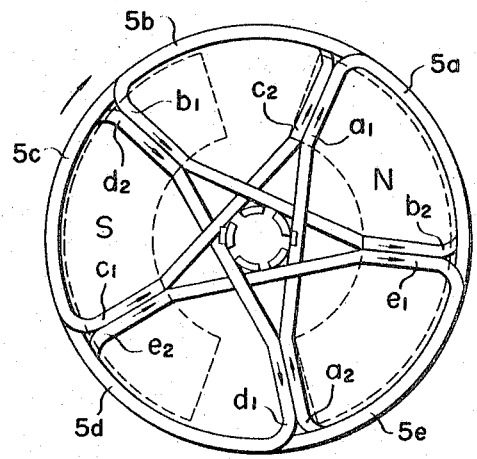
Figure 8:
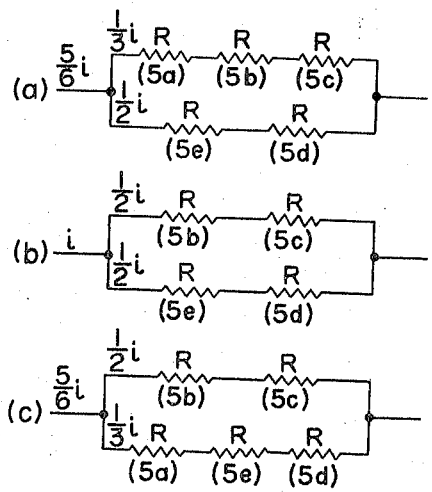
Figure 9:
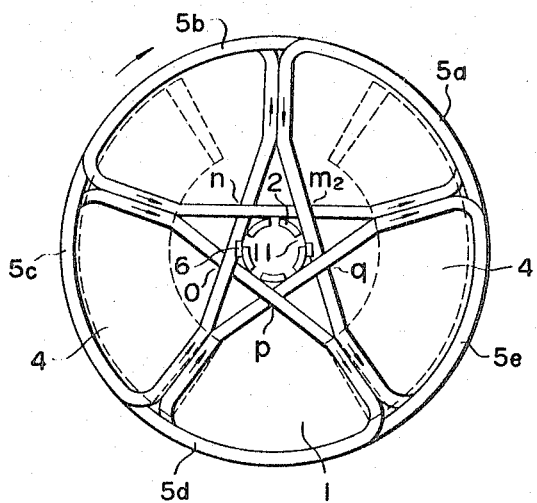
Figure 10A:
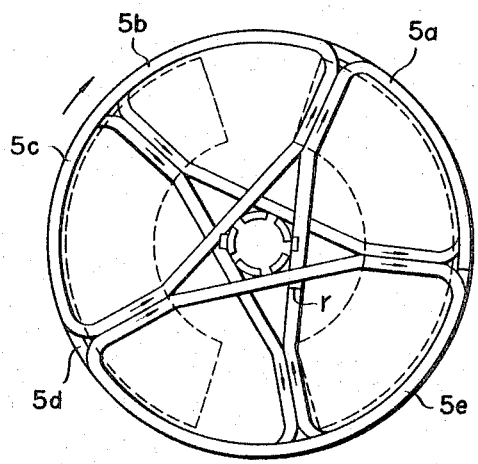
Figure 10B:
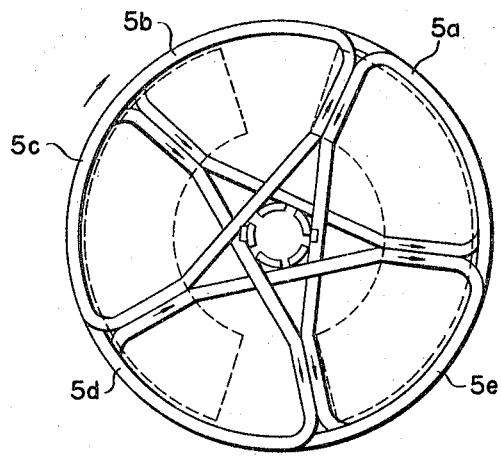
Figure 11:
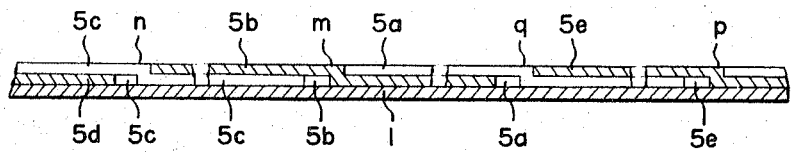
Figure 12:
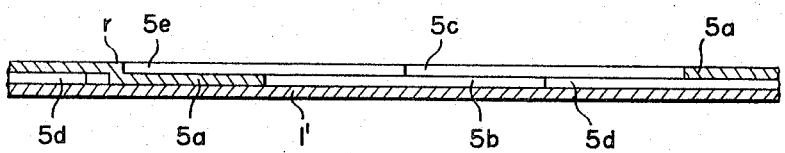
Figure 13:
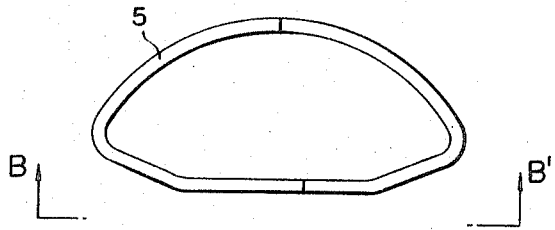
Figure 14:
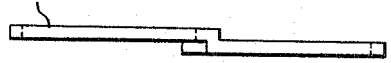

FIG. 1 shows a diametric sectional view of the motor according to the present invention, FIG. 2 is a sectional plan view taken along the line A–A' of FIG. 1, FIGS. 3 to 7 are respectively plan views similar to that of FIG. 2, but illustrating different relative positions of the field magnets and coils, FIGS. 8a–8c show connection diagrams of the coils and the currents flowing therethrough, FIGS. 9, 10a and 10b are plan views of a coil disc consisting of five overlapped coils, FIGS. 11 and 12 illustrate developments of the coils, FIG. 13 is a plan view of the coil element employed in the invention, and FIG. 14 is a side view thereof.

In FIG. 1, 1 indicates a flat coil disc and 2 a commutator. They are assembled and moulded integrally with synthetic resin and the like to constitute a disc-shaped rotor carried to a shaft 3. A stator consists of two axially magnetized sector-shaped field magnets 4, 4 made of ferrite. 5a, 5b, 5c, 5d and 5e are five sector-shaped coreless coils and so arranged that they are overlapped with one another in a plane, as shown in FIG. 2. For example the coils 5b and 5e contiguous to the coil 5a are disposed in such manner that the sides of coils 5b and 5e touch each other on the radial center line, or bisecting radius, of the coil 5a, and the other coils 5c, 5d are in turn disposed similarly thus forming an annular coil disc. The brushes are indicated 6, and 7 indicates junctions of legs of two coils which are connected with commutator segments 2, as shown in FIG. 2. The brushes 6 are situated respectively on the radial center lines, or bisecting radius, of the field magnets 4, while slits or gaps 11 of the commutator 2 lies on the radial center line, or bisecting radius, of each coil. A casing 8, 9 of the motor serves as a yoke for the sector-shaped field magnets 4, 4, so that the magnetic flux path of the motor is formed through the field magnets 4, 4 and the casings 8, 9. Thus the disc-shaped rotor rotates across the magnetic flux, with the shaft 3 thereof mounted in a bearing 10 fitted in the casing 8.

Figure 3:
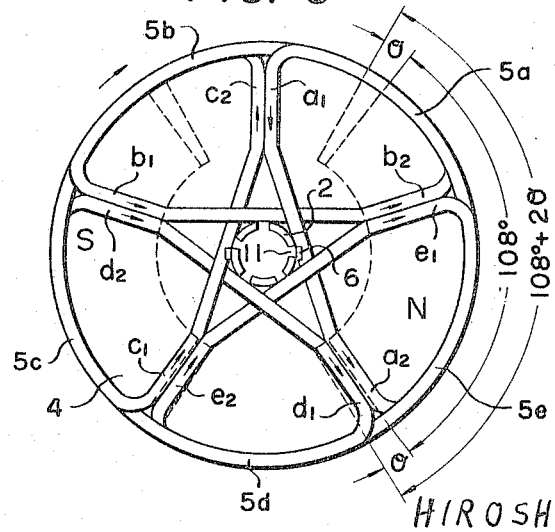

Operation of the motor according to the invention will now be described. FIG. 3 shows a case where the coils are at the farthest position from that upon commutation, that is, two active portions $a_1$, $c_1$ of the coils are situated at the center of one circumferential or arcuate gap between the field magnets. Active portions of the coils are designated $a_1$, $a_2$, $b_1$, $b_2$, $c_1$, $c_2$, $d_1$, $d_2$, $e_1$, $e_2$, so that the active portions $a_1$, $c_2$, are located at the center of such arcuate gap and cross no flux. Therefore portions $a_1$, $c_2$ produce no torque, while the remaining active portions contribute to produce torques. In this case, six active portions $b_2$, $e_1$, $b_1$, $d_2$, $c_1$, $a_2$ produce torques, and the center angle of a sector $e_2$, $5_d$, $d_1$, is $$\frac{360°}{5}=72°$$

Figure 4:
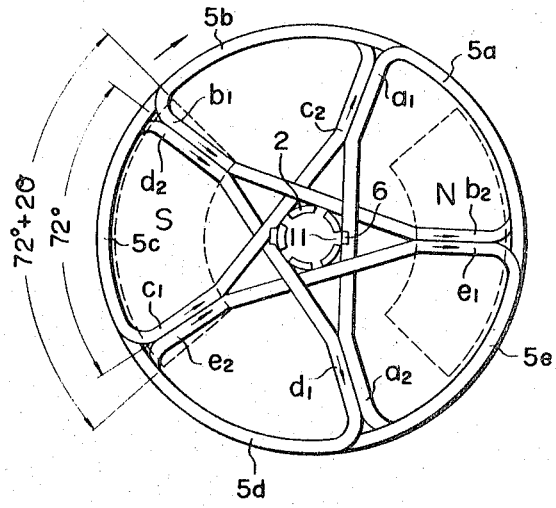

Therefore the maximum angular extent of the field is $(360°-2\times72°)/2=108°$. When the active portions $e_2$, $d_1$ are added thereto, the active portions capable of producing torque become eight, the effective angular extent of the field becomes $180°+2\theta$, where $\theta$ is the angle corresponding to the effective angular width of an active portion of coil. In FIG. 4, showing the rotor upon commutation, no current flows through the active portions $a_1$, $a_2$ of the coil $5_a$, while the active portions $c_2$, $d_1$, through which current flows cross no flux, therefore six active portions $b_1$, $d_2$, $c_1$, $e_2$, $b_2$, $e_1$ cross the flux to produce torques. The effective angular extent of the field at this time is equal to $72°+2\theta$, and this angle is the minimum angle at which six active portions cross fluxes. FIGS. 6 and 7 illustrate the field increased by the angular coil width just before and after commutation. Currents flowing through the active portions $a_1$, $c_2$ in FIG. 6 have opposite direction to each other, so that these active portions do not contribute to torque production. Therefore, eight remaining active portions $b_1$, $d_2$, $c_1$, $e_2$, $d_1$, $a_2$, $b_2$, $e_1$ contribute to torque production. When the active portions $a_2$, $d_1$ are at the farthest position from that upon commutation, that is at 72° therefrom, the effective angular extent of the field is equal to 144°, and this angle is the maximum angle at which eight active portions of the coils cross fluxes. Thus the effective angular extent of the field lies between the maximum angle 144° and the minimum angle 72°+2θ.

Next, torque will be calculated. At starting, upon commutation in FIG. 4, the coils $5_b$ and $5_c$ or $5_e$ and $5_d$, respectively, are connected in series, and the pair of series coils are in parallel, as shown in FIG. 8b, so that current flowing through each pair of series coils is $$\frac{1}{2}i$$

on the contrary in FIG. 3, the coils $5_a$, $5_b$ and $5_c$ or $5_e$ and $5_d$, respectively, are in series, and these sets of series coils are in parallel, as shown in FIG. 8a, so that current flowing through the coils $5_e$, $5_d$ is $$\frac{1}{2}i$$

and that through coils $5_a$, $5_b$, $5_c$ is $1/2i$. Similarly in FIG. 5, current of $$\frac{1}{2}i$$

flows through the coils $5_b$, $5_c$, while current of $$\frac{1}{3}i$$

flows through the coils $5_a$, $5_e$, $5_d$, as shown in FIG. 8c. Upon commutation as in FIG. 4, number of active portions of the coils serving for torque production is six, and if total active turns of the coils are N, the turns of one coil are equal to N/5. Therefore the torque generated is given by $$6 \times \frac{1}{2}i \times \frac{N}{5} = \frac{3}{5}Ni$$

Figure 5:
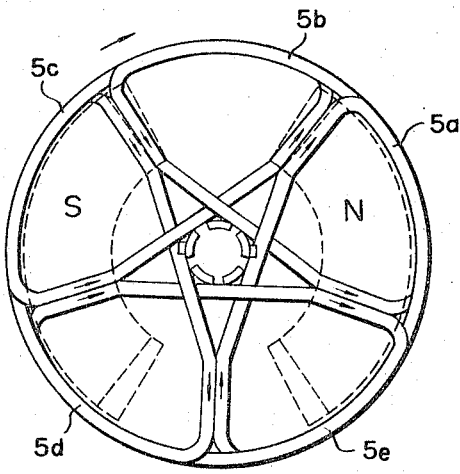

On the other hand, in FIGS. 3 and 5, the number of active portions of the coils serving for torque production is eight, and four active portions are contained in each series circuit, therefore total torque to be generated is given by $$4 \times \frac{1}{2}i \times \frac{N}{5} + 4 \times$$

$$\frac{1}{3}i \times \frac{N}{5} = \frac{2}{3}Ni$$

Thus variation of torque during rotation is $$\frac{2}{3}Ni - \frac{3}{5}Ni = \frac{1}{15}Ni$$

In other words, the ratio of torque variation to the torque upon commutation is $$\frac{1}{15}Ni \div \frac{3}{5}Ni = \frac{1}{9}$$

or 11% at most. Therefore, during starting as well during rotation, very uniform torque can be obtained. Torques just before and after commutation in FIGS. 6 and 7 can be calculated similarly.

Next, referring to the spark voltage generated, the spark voltage is generally proportional to the product of flux, angular velocity, number of turns of coils and current variation. As a simplest case, when a motor with five coils and two field magnets and a motor with three coils and two field magnets have the same flux, angular velocity and current variation, the spark voltages thereof are respectively proportional to the number of turns of coils N/5 and N/3, respectively, so that the spark voltage of the former is 60% of the latter. As the current variation of the former, however, is practically far less than the latter, the ratio of the spark voltage becomes below 50%. Therefore the spark voltage generated can be greatly reduced.

The following table lists performances of the motor according to the invention in comparison with a usual small phonic motor of nearly the same price.

| Kind of motor | No-load current (ma.) | Current at 10 gr.-cm. load (ma.) | Efficiency |
|---|---|---|---|
| Usual motor | 30 | 100 | About 40%. |
| Motor according to the invention. | 10 | 60 | About 65%. |

From the above table it will be understood that the load current of the motor according to the invention decreases to 60% of that of the usual motor, and accordingly power consumption decreases an equal amount. Efficiency of the motor also increases to 65%, so that a phonic motor of low price and high efficiency can be provided.

As described above, the flat coreless direct current motor with five coils and two field magnets according to the invention, useable as a phonic motor, generates few sparks upon commutation, has a uniform torque, and has less power consumption. Therefore, it has a high efficiency. Since the motor has a flat structure, a tape recorder or record player in which the motor is employed can be made flatter so as to be handy to carry.

Now, the embodiments shown in FIGS. 9 to 12 will be explained.

If the coils $5a$, $5b$, $5c$, $5d$, $5e$ are arranged sector offset from one another on the coil disc 1 by one-half the angular extent of the coil sector, the coils overlap one another. In this case, it is desired to reduce the overall thickness of the coil assembly as much as possible. The minimum thickness of the coil assembly can be obtained by assembling the coils in such manner that two coils are overlapped with each other, and the combined thickness is twice that of the coil. Such coil assembling is carried out in one of the following three manners. First, as shown in FIGS. 9 and 11, five coils are all formed to have a bent step portion corresponding in height to the coil thickness, and the coils are combined with one another. Secondly, as in FIGS 10a and 12, one of five coils is formed to have a bent step portion corresponding in height to the coil thickness, and is combined with the remaining flat coils. Thirdly, as in FIG. 10b, three coils are formed to have a bent step portion and combined with the remaining flat coils. In FIG. 9, intersecting points of the coils are designated with m, n, o, p, q. At the intersecting point m, the coil $5b$ is bent offset by a coil thickness to form a step portion, as shown in FIGS. 13 and 14, and intersected with the coil $5a$. At the intersecting point n, the coil $5c$ is bent offset and intersected with the coil $5b$.

Similarly, the coils $5d$, $5e$ are in turn combined with one another. The thickness of the coil assembly is therefore twice that of the coil. In this case, it is desirable to bend the step portion at an obtuse angle and to round off the angle with a proper curvature in order to prevent the insulation of the coil from being injured. It is highly desirable that the overall thickness of the coil assembly is twice that of one coil, but it is practically difficult to make the dimension of the bent step portion precisely equal to the coil thickness, so the bent step portion has the height of nearly twice the thickness of one coil. In the embodiment of FIG. 12, the flat coils $5b$, $5d$ are placed on the coil disc 1 and the flat coils $5e$, $5c$ are further placed on coils $5b$, $5d$, while the coil $5a$ is bent by the thickness thereof to form a step portion and interposed between the coils $5d$ and $5e$. Those coils are arranged offset from one another by half the coils sector angle to form the coil assembly, as shown in FIG. 10a. The thickness of the coil assembly becomes nearly twice that of the thickness of one coil. The intersecting point of the coils is designated r in FIG. 12. If, in the motor constructed as above, magnetomotive force is constant, flux density is in inverse proportion to the gap between poles.

When, for example, the thickness of one coil is 1 mm., the overall width of the gap less the thickness of the coil assembly is 1 mm. and the overall thickness of the coil assembly is 2 mm., 3 mm. or 5 mm., then the flux density at 3 mm. thick of the coil assembly is 75% of that at 2 mm., while the flux density at 5 mm. is 50% of that at 2 mm. Consequently, it is possible to increase the flux density by decreasing the air gap. Further, if the angular extent of the field magnets 4, 4 is properly selected, the spark generating voltage of the commutator becomes very small as compared with a motor with three coils and two field magnets, and a coreless direct current motor, with five coils and two field magnets, of high efficiency and of uniform torque can be obtained. As described above, in the coreless direct current motor with five coils and two field magnets, at least one coil out of five coils is formed so as to have a bent step portion in order to reduce the overall thickness of the coil assembly, the remaining coils are combined with said coil on a plane disc to constitute a coil assembly, the overall thickness of the coil assembly is twice the coil thickness and the coil assembly is mounted between field magnets and a stator, so that the motor can be made very flat as compared with usual small motors. The motor having the aforementioned performances, when used as a phonic motor, produces very little noise, and a tape recorder or record player employing the motor can be made flat and handy to carry.

What I claim is:

1. A flat coreless direct current motor comprising, in cmobination, a substantially flat and substantially planar core assembly including five truncated-sector-shape substantially flat coils each having an angular extent of substantially 144° and a pair of radial legs, said coils being arranged in arcuately overlapping relation with each coil arcuately overlapping adjacent coils to an angular extent of substantially 72°; a pair of truncated-sector-shape field magnets arranged in diametrically opposed symetrically arcuately spaced relation and substantially concentric with said coil assembly; a commutator substantially concentric with said coil assembly; means mounting said coil assembly as said commutator for conjoint rotation relative to said field magnets; magnetic yoke means defining, with said field magnets, an air gap in which said coil assembly is positioned; the leading end of each coil, considered in the direction of coil assembly rotation, being connected to the trailing end of an adjacent coil at a respective junction point, and each junction point being connected to a respective commutator segment; and a pair of diametrically opposite brushes engaged with said commutator, the relative angular position of said brushes being such that commutation of each coil is effected when its bisecting radius coincides with the bisecting radius of a field magnet.

2. A direct current motor, as claimed in claim 1, wherein the minimum effective angular extent of each field magnet is equal to 70° plus twice the angular extent of a truncated sector occupied by the coil radial leg.

3. A direct current motor, as claimed in claim 1, in which the maximum effective angular extent of each field magnet is equal to the angular extent of each of said coils.

4. A direct current motor, as claimed in claim 1, in which one of said coils is formed with an offset step portion whose height is substantially equal to that of the thickness of the coil, said one coil and the coil contiguous thereto intersecting each other at said step portion; said one coil and another coil being overlapped; whereby to constitute a coil assembly whose overall thickness is substantially equal to twice the thickness of one coil.

5. A direct current motor, as claimed in claim 1, wherein three of said coils are formed with a bent offset step portion whose height is substantially equal to that of the thickness of a coil, those coils having such offset bent step portion and the coils contiguous thereto intersecting at the respective offset bent step portion, while said coils having an offset bent step portion overlap one another whereby to provide a coil assembly having an overall thickness substantially equal to twice the thickness of one coil.

6. A direct current motor, as claimed in claim 1, in which each of said coils is formed with an offset bent step portion whose height is substantially equal to that of the thickness of the coil, contiguous coils intersecting one another to constitute said coil assembly having an overall thickness equal to substantially twice the thickness of one coil.

References Cited
UNITED STATES PATENTS

| | | | |
|---|---|---|---|
| 1,737,128 | 11/1929 | Ross | 310—268 |
| 2,853,637 | 9/1958 | Ishikawa | 310—268 |
| 2,970,238 | 1/1961 | Swiggett | 310—268 |
| 3,118,076 | 1/1964 | Held | 310—268 |
| 3,144,574 | 9/1964 | Baudot | 310—268 |
| 3,280,353 | 10/1966 | Haydon | 310—268 |

MILTON O. HIRSHIELD, *Primary Examiner.*

J. W. GIBBS, *Assistant Examiner.*